July 16, 1929.　　　H. D. WINTON　　　1,720,706
METER SWITCH
Filed May 21, 1925　　　2 Sheets-Sheet 1

INVENTOR.
Henry D. Winton
By his Attorney
Myron M. Davis.

July 16, 1929. H. D. WINTON 1,720,706
METER SWITCH
Filed May 21, 1925 2 Sheets-Sheet 2
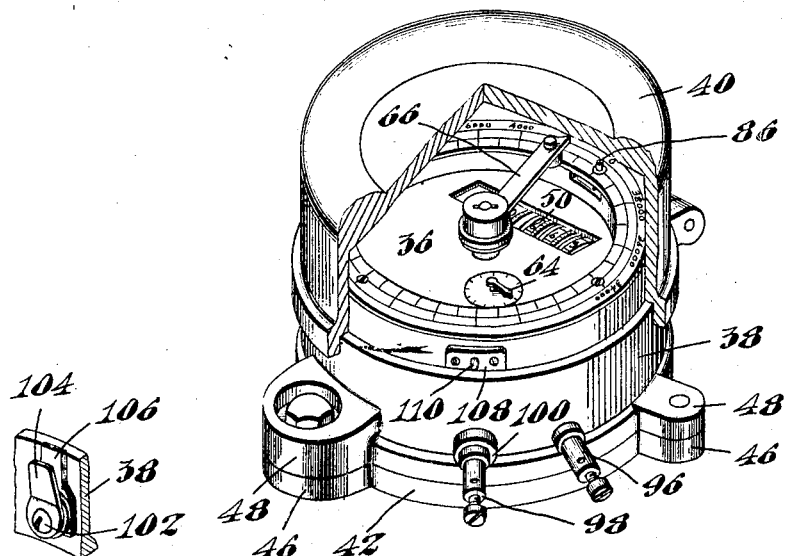
Fig.2.
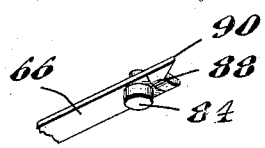
Fig.5.
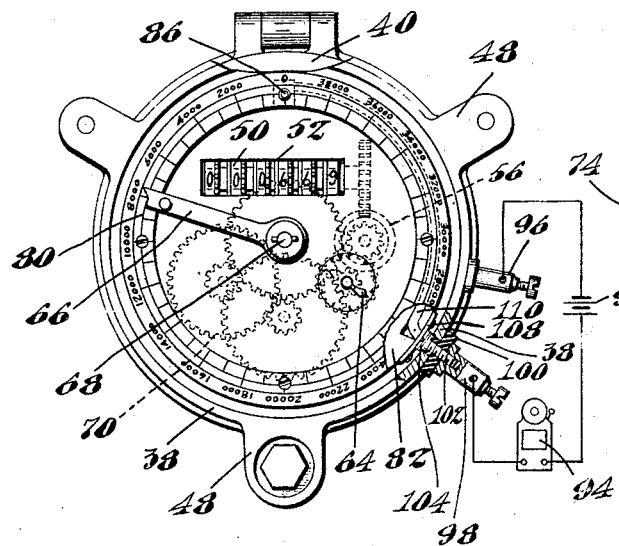
Fig.6.
Fig.3.
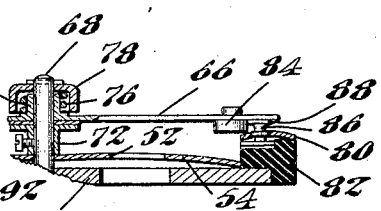
Fig.4.
INVENTOR
Henry D. Winton,
By his Attorney,
Myron M. Davis.

Patented July 16, 1929.

1,720,706

UNITED STATES PATENT OFFICE.

HENRY D. WINTON, OF WELLESLEY, MASSACHUSETTS, ASSIGNOR TO HERSEY MANUFACTURING COMPANY, OF SOUTH BOSTON, MASSACHUSETTS, A CORPORATION OF MASSACHUSETTS.

METER SWITCH.

Application filed May 21, 1925. Serial No. 31,913.

This invention relates to meters and is illustratively shown in connection with meters adapted to be used in conjunction with an alarm in order to indicate to the user the completion of the passage of a predetermined quantity of fluid through the meter.

In certain sections of the country, the water supplied from the usual sources and, in some cases, from any available source, is excessively hard so that it has become customary to employ water softening apparatus not only for domestic installations but more especially for commercial plants where the hardness of the water is actually harmful to the boilers and machinery employed. Such apparatus usually comprises a tank containing suitable chemicals through which a certain definite quantity of water may be passed before the chemicals are either used up or rendered ineffective so that they must be removed or renewed. In the larger installations of such apparatus, two similar tanks are usually provided so that the supply of treated water need not be interrupted and valves are provided to turn the supply from one tank to the other. A meter is customarily employed to measure the quantity of water which has passed through the softening tank so that the user may know when the supply of chemical needs to be renewed.

Since such meters, as usually constructed, must be inspected by the user in order to determine how much water has passed through and been registered, an unnecessary burden is imposed upon the user and the danger incurred that readings will not be taken often enough to prevent passing the desired point so that water may be passed through the softening apparatus which will not be properly treated. Accordingly, an object of the invention is to provide a meter having an improved registering device constructed and arranged to warn the user and indicate the passage of a predetermined quantity of fluid without requiring inspections of the meter.

To this end, a feature of the invention relates to an improved construction of the registering device by means of which an electric circuit is automatically closed when a certain quantity of fluid has been measured. With such a construction, an alarm may be connected to the meter and placed either near the meter or at a distance therefrom to indicate either visibly, as by a light, or audibly, as by a bell, that the softener tank must be refilled. In those installations where duplicate tanks are employed, the circuit may be arranged to energize the motor of a motor-operated valve to turn the flow of water from one tank to the other.

Other features of the invention relate to the novel construction and arrangement of the circuit closing mechanism in the meter. In the illustrated construction, the registering device is enclosed within a metallic casing removably attachable to a meter the capacity of which is suitable for the particular installation in question. This casing is provided with binding posts to which the alarm circuit outside the meter may be connected. One of these posts, insulated from the casing, is electrically connected to a fixed contact positioned near the periphery of the dial of the registering device. The latter device is furnished with a slow-moving centrally-disposed spindle, geared to move in fixed relation to the other usual elements of the device. An arm, frictionally mounted on this spindle, is electrically connected to the other post and moves from a starting point in which it is manually placed by the user, into contact with the fixed contact terminating the other side of the circuit. Suitable indicia upon an auxiliary annular dial enables the user to set the arm at the proper starting point so that the desired quantity of water will be measured before the alarm is sounded.

These and other features of the invention will be better understood from a consideration of the following specification taken in connection with the accompanying drawings, in which:—

Fig. 2 is a perspective view, with parts broken away, of the registering device and its protective casing;

Fig. 3 is a plan view of the same, with the cover removed and a part of the dial broken away;

Fig. 4 is a vertical section through the settable hand and the fixed contact;

Fig. 5 is a detail in perspective showing the under side of the hand, and

Fig. 6 is a detail of a fragment of the casing showing the insulated spring contact at the inner end of one of the binding posts.

Figure 1:
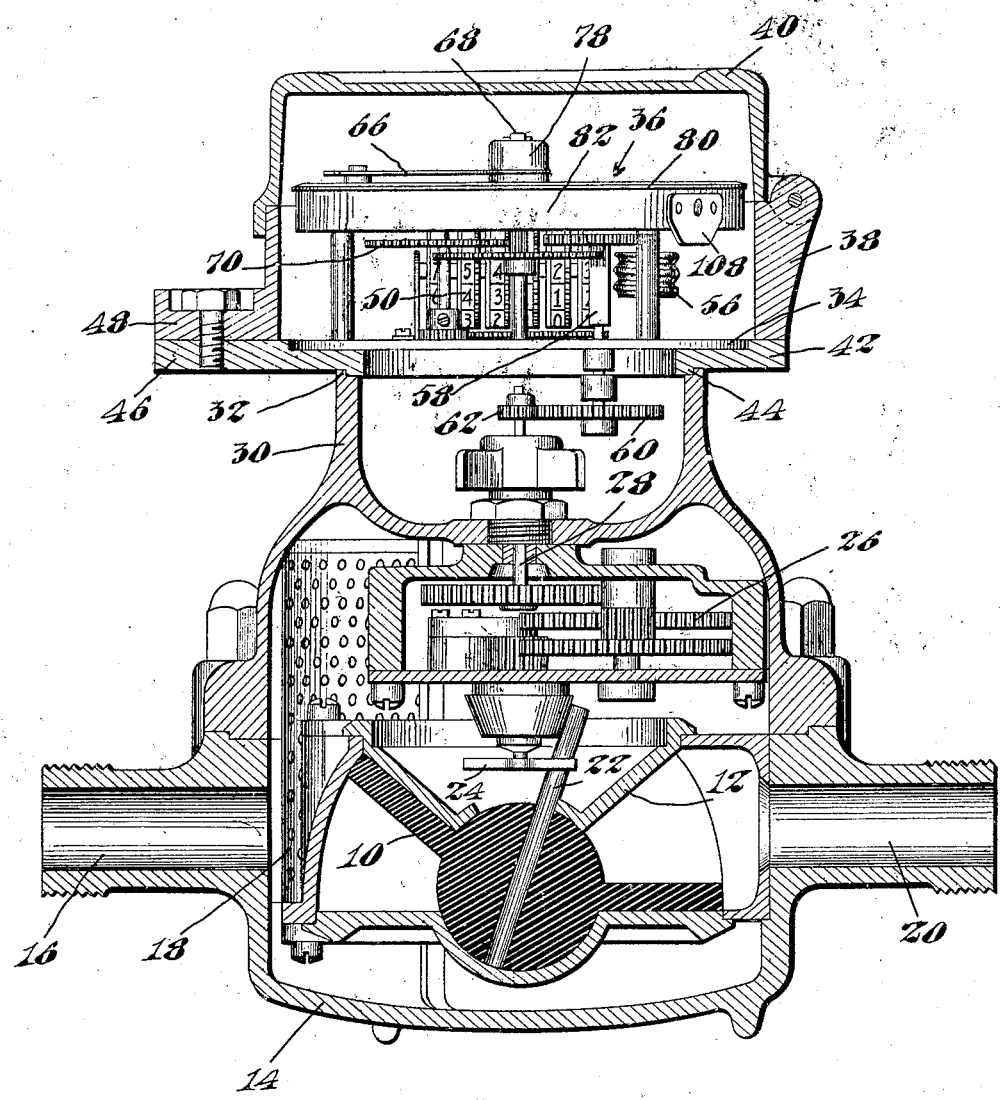
Fig. 1 is a vertical section showing a water meter embodying the alarm actuating mechanism to be described.

For the sake of illustration, I have shown my novel mechanism in a water meter of the positive displacement type, in which the measuring apparatus employs a nutating disc 10, operating within a chamber 12, inside a larger casing 14 provided with an inlet 16, a screen 18, and an outlet 20. The disc 10 is provided with a pin 22 arranged to actuate a yoke 24 which is connected, through a train of reducing gears 26, with a shaft 28 which passes through a water-tight stuffing box into a chamber formed by an upwardly extending neck 30 having a shouldered rim 32.

In certain sizes of meters, it is possible, within the limitations of good design, to have the diameter of this neck 30 large enough to receive the base plate 34 of a standard sized registering device 36 directly (not shown). In that case, the lower half 38 of the casing to which the protective cover 40 is hinged would be attached directly to lugs (not shown) at the top of the neck 30. In other cases, as in the form herein illustrated, where the neck 30 is smaller than the base plate 34, an adapter plate 42 may be interposed. This adapter plate 42 has a centering rib 44 which coacts with the shoulder 32 and lugs 46 coinciding with the lugs 48 of the lower half 38 of the cover casing by means of which the latter may be bolted in place. The base plate 34 is screwed to the adapter plate 42 and the adapter plate is secured to the lugs (not shown) at the top of the neck 30.

The registering device 36 of the meter illustrated is of the so-called straight reading type and is provided with a plurality of figure carrying discs 50 positioned below an opening 52 (Fig. 4) in a dial 54. These discs are geared together in a well understood fashion so that each disc except the last is moved ahead one tenth of its periphery for each rotation of the disc on its right, thus making the row of figures which is visible through the opening 52 give a direct reading of the quantity registered. The right hand disc, and through it all the discs, is driven by a worm 56 which is connected through reduction gearing with a driving shaft 58 projecting down through the base plate 34 and carrying a gear 60 which meshes with a gear 62 upon the upper end of the shaft 28. A proper choice of the gears 60 and 62 enables either slight corrections in the meter or a change of the whole ratio between the meter measurement and the dial readings. A small hand 64, mounted on an upward extension of the shaft 58, above the dial 54, serves as a digit hand, one full revolution of which is equivalent to a single step in, or one-tenth of, a revolution of the right hand or last disc 50.

To make this meter capable of marking off the consumption of an arbitrary quantity of water, starting with the registering device in any position in which it may happen to be, and to relieve the user of the need of reading it frequently, a settable hand 66 is provided which is mounted on a slow-moving centrally-disposed spindle 68. This spindle is connected with the drive shaft 58 through a train of reduction gearing 70 shown in Figs. 1 and 3, beneath the dial 54 and, in the particular arrangement illustrated, it will have one complete revolution for each forty thousand gallons of water measured.

The hand 66 is frictionally connected to the spindle 68 in the manner best shown in Fig. 4, by providing a flanged sleeve 72 which is secured to the spindle and pressing the hand 66 against the flange of this sleeve 72, a washer being interposed. The hand itself is preferably made of a flat strip provided with an integral collar 74, and a coiled spring 76 surrounding this collar is held in place by means of a cupped member 78 which overlies and encloses the spring and is itself held in position by a pin passing through the end of the spindle. This makes a compact arrangement of neat apearance which allows the hand 66 to be arbitrarily positioned and repositioned upon the spindle 68 without danger of changing the amount of friction between the parts or of disturbing their proper relation. It will be noted that the hand is so positioned upon the spindle 68 that it is above the dial and out of the way so that it is not apt to interfere with the usual parts of the registering device whether the latter is of the straight reading type herein illustrated or of the well-known round reading type. At the same time the hand is readily accessible for resetting. Cooperating with the settable hand 66 is an annular auxiliary dial 80 bearing suitable indicia under the guidance of which the hand may be moved away from the zero point to a point corresponding to the quantity which it is desired to pass through before an alarm is given. The auxiliary dial 80 is supported upon a ring 82 of insulating material so that it forms a ledge around the main dial 54, and, in order that the hand may not come accidentally into contact with the dial 80, usually made of metal, a button or spacer 84 of fibre, rubber or similar insulating material, is passed up into a hole in the hand 66 and then is compressed to bulge its upper end to hold it in place. This button 84 rides on the dial 80 until the hand reaches the zero point at the top of the dial, whereupon it makes contact with a fixed contact 86 which is secured in the auxiliary dial 80 and is lifted slightly (Fig. 4) or flexed by reason of its beveled terminal 88 of non-corrosive metal depending beside the spacer button 84. The tip of the fixed contact 86 is made of similar metal and the scraping contact caused by the turning of the hand and the slight lifting of its outer end as it comes into contact, makes doubly sure the completion of the electrical circuit between the two. The lifting of the hand 66 is resisted by the spring 76. The end of the hand 66 is pointed at 90 to facilitate its exact positioning with respect to the dial 80. It will be noted that the button 84, riding on the dial 80, guides the terminal portion 88 in a plane intersecting the fixed contact 86.

As has already been suggested, the operation of an alarm may best be effected by the completion within the meter itself of an electric circuit which may include a battery 92 (Fig. 3) and a bell 94 or other device positioned outside the meter wherever they may be most convenient. In order that it may be easy to connect this outside circuit with the circuit closing parts within the meter casing, binding posts 96 and 98 have been mounted upon the lower half 38 of the cover casing. The post 96 is secured directly to the metal casing so that it is electrically connected through the base plate 34 of the registering device with the spindle 68 and hence with the settable hand 66. The post 98, on the other hand, is electrically insulated from the casing by a fibre washer 100 having an inwardly extending flange and the screw 102 which holds this post on the casing serves also to clamp in place and to connect with it a spring contact 104 (Fig. 6) which is insulated from the casing by a mica spacer 106. A contact plate 108 is mounted upon the ring 82 of insulation in position for engagement with the spring contact 104 when the registering device is secured in place within the casing, thus facilitating the assemblage of the meter. This contact member 108 is connected to the fixed contact 86 by a wire 110 running along a groove formed in the ring 82 of insulation beneath the annular dial 80.

Let us assume that the meter has been installed and is to be put in use, some suitable alarm circuit having been connected to the binding posts 96 and 98. If it is desired to pass 18000 gallons through the meter before the alarm is sounded, then the settable hand 66 will be manually rotated upon the spindle 68 until the point 90 coincides with the figure 18000 upon the annular auxiliary dial 80 and the water allowed to flow. Although the friction between the spindle 68 and the hand 66 is not sufficient to prevent the setting of the hand easily, it is enough to insure continued forward movement of the hand with the spindle until this quantity of water has been measured and registered, the button 84 riding upon the dial 80. At that time, the beveled terminal 88 on the hand will meet and ride over the fixed contact 86 with a scraping which is accentuated by the deflection of the hand against the opposition of the spring 76 as it is raised slightly out of its normal plane. This completes the circuit and actuates the alarm or the like, calling the user who will reset the hand 66 and give the necessary attention to the associated apparatus.

Having thus described my invention, what I claim as new and desire to secure by Letters Patent of the United States is:

1. In a water meter, a protective casing, a registering device supported therein comprising reduction gears, a fixed dial concealing said gears, and movable recording elements associated therewith including a rotatable spindle extending through said dial, a rigid fixed contact carried by said dial and electrically insulated from said registering device, indicia surrounding said dial arranged in an order increasing in a direction reverse to the direction of rotation of the spindle to indicate the extent of the measurement denoted by rotation of said spindle to said contact from a predetermined point, a hand connected to said spindle pointing to said indicia electrically connected in an electrical circuit and arranged to complete said circuit when brought against said fixed contact, and means for holding said hand in set position on said spindle constructed and arranged both to allow the ready repositioning thereof and to insure adequate electrical contact between said parts when the hand has reached the fixed contact.

2. In a fluid meter, a registering device comprising a main dial and a spindle extending above said dial, a metallic annular auxiliary dial surrounding and insulated from said main dial, a fixed contact projecting above said auxiliary dial, an arm on said spindle extending over said annular dial, and means carried by the arm constructed and arranged to insulate said arm from the auxiliary dial and to guide its movement in a plane intersecting the fixed contact.

3. In a fluid meter, a spindle having a shoulder, a hand loosely mounted on said spindle and resting on said shoulder, a coiled spring surrounding said spindle with one end bearing against said hand, a cupped member overlying and enclosing said spring, and means for holding said cupped member in a position to compress the spring and frictionally hold the hand against the shoulder of the spindle, whereby the hand will be caused to move with the spindle but may be arbitrarily positioned manually with respect thereto.

4. In a fluid meter, a registering device including a dial, a central spindle projecting above said dial, indicating devices associated with said dial, a ledge around part of said dial, and means to complete an electrical circuit after a predetermined angular movement of the spindle, said means comprising a hand frictionally mounted on said spindle above the indicating devices and having an insulating button near its end riding on said ledge, together with a fixed contact in said ledge insulated from said dial and spindle and projecting into the path of movement of the hand.

5. In a fluid meter, a protective metallic casing, binding posts mounted on the outside of said casing, one of said posts being insulated from said casing and provided with a contact part projecting inside the casing, a registering device removable from said casing and including mechanism to complete an electrical circuit to denote the measurement of a predetermined quantity of fluid, said mechanism including an independent contact element insulated from parts of the mechanism, and a resilient member secured to one of said contact members and projecting from the inside of the casing constructed and arranged to cooperate with said independent contact element to complete a circuit from the contact element to the insulated binding post when the casing and the registering device are secured in position on the meter.

6. In a fluid meter, registering means comprising a dial, a moving indicator and a rotating part extending through the dial to a position conveniently accessible to the user, a metallic ledge around part of said dial, and means for indicating the passage and measurement of a predetermined quantity of fluid comprising a fixed electrical contact in said ledge and insulated therefrom and a settable moving contact arm frictionally mounted upon said rotating part of said registering means, said settable contact arm overhanging the ledge and having an insulating spacer riding on the ledge to prevent electrical contact between the arm and the ledge and constructed and arranged to engage the fixed contact.

7. In a fluid meter, a metallic casing for a circuit closing device, a binding post in said casing, another binding post in said casing and insulated therefrom, and a spring contact piece secured to said insulated binding post inside said casing and insulated from the casing.

8. In a fluid meter, a hand for a circuit closing device having a rotatable spindle, said hand being made of a flat strip having a collar at its inner end to surround said spindle, a spacer button of insulating material near the outer end of the hand projecting beyond the flat surface thereof, and a beveled contact piece on the outer end of said hand adjacent to said button and projecting a less distance than does said button.

In testimony whereof I have signed my name to this specification.

HENRY D. WINTON.